United States Patent
Xiong et al.

(10) Patent No.: US 10,235,073 B2
(45) Date of Patent: Mar. 19, 2019

(54) USING A FLAG TO SELECTIVELY PERMIT CONFIGURATION CHANGES TO A DATA STORAGE OBJECT HAVING AN ACTIVATED FEATURE

(71) Applicant: EMC IP Holding Company, LLC, Hopkinton, MA (US)

(72) Inventors: Tianfang Xiong, Shanghai (CN); Hongru Xu, Shanghai (CN); Yuanyang Wu, Shanghai (CN); Ruisong Wang, Shanghai (CN); He Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 15/273,034

(22) Filed: Sep. 22, 2016

(65) Prior Publication Data

US 2017/0090806 A1   Mar. 30, 2017

(30) Foreign Application Priority Data

Sep. 25, 2015 (CN) .......................... 2015 1 0623730

(51) Int. Cl.
*G06F 12/00* (2006.01)
*G06F 3/06* (2006.01)

(52) U.S. Cl.
CPC .......... *G06F 3/0629* (2013.01); *G06F 3/0604* (2013.01); *G06F 3/0653* (2013.01); *G06F 3/0683* (2013.01); *G06F 12/00* (2013.01)

(58) Field of Classification Search
CPC ...................................................... G06F 12/00
USPC ......................................................... 711/154
See application file for complete search history.

(56) References Cited

U.S. PATENT DOCUMENTS

| 9,305,009 | B1 | 4/2016 | Bono et al. |
| 9,330,103 | B1 | 5/2016 | Bono et al. |
| 9,378,219 | B1 | 6/2016 | Bono et al. |
| 9,753,943 | B1 | 9/2017 | Bono et al. |

(Continued)

FOREIGN PATENT DOCUMENTS

| CN | 1696888 A | 11/2005 |
| CN | 101501652 A | 8/2009 |

(Continued)

OTHER PUBLICATIONS

Jean-Pierre Bono et al.; "Unified Datapath Processing With Virtualized Storage Processors," U.S. Appl. No. 13/828,294, filed Mar. 14, 2013.

(Continued)

*Primary Examiner* — Gautam Sain
(74) *Attorney, Agent, or Firm* — BainwoodHuang

(57) ABSTRACT

Embodiments are directed to techniques for enforcing prerequisite conditions on a data object for an operational feature both upon initiation of that operational feature and while that operational feature is maintained. Accordingly, improved techniques enforce conditions by setting a flag associated with a data object upon confirming that the conditions have been met and checking the flag anytime a configuration change to the data object is requested that would cause the conditions to be violated. If the flag is set, any configuration change that would cause the conditions to be violated is rejected.

14 Claims, 3 Drawing Sheets

(56) References Cited

U.S. PATENT DOCUMENTS

| | | | |
|---|---|---|---|
| 2006/0050622 A1* | 3/2006 | So | G06F 3/0619 |
| | | | 369/275.1 |
| 2006/0200498 A1* | 9/2006 | Galipeau | G06F 17/30315 |
| 2007/0136389 A1* | 6/2007 | Bergant | G06F 11/1435 |
| 2015/0227602 A1* | 8/2015 | Ramu | G06F 17/30575 |
| | | | 707/634 |
| 2015/0310054 A1* | 10/2015 | Passey | G06F 17/30221 |
| | | | 707/703 |

FOREIGN PATENT DOCUMENTS

| | | |
|---|---|---|
| CN | 103729237 A | 4/2014 |
| CN | 104468521 A | 3/2015 |

OTHER PUBLICATIONS

Jean-Pierre Bono et al.; "Techniques for Optimizing Metadata Resiliency and Performance," U.S. Appl. No. 14/674,382, filed Mar. 31, 2015.

First Chinese Office Action (with attached English translation), issued Nov. 30, 2018, by The Patent Office of the People's Republic of China for Chinese Application No. 201510623730.1, filed Sep. 25, 2015, 12 pages.

\* cited by examiner

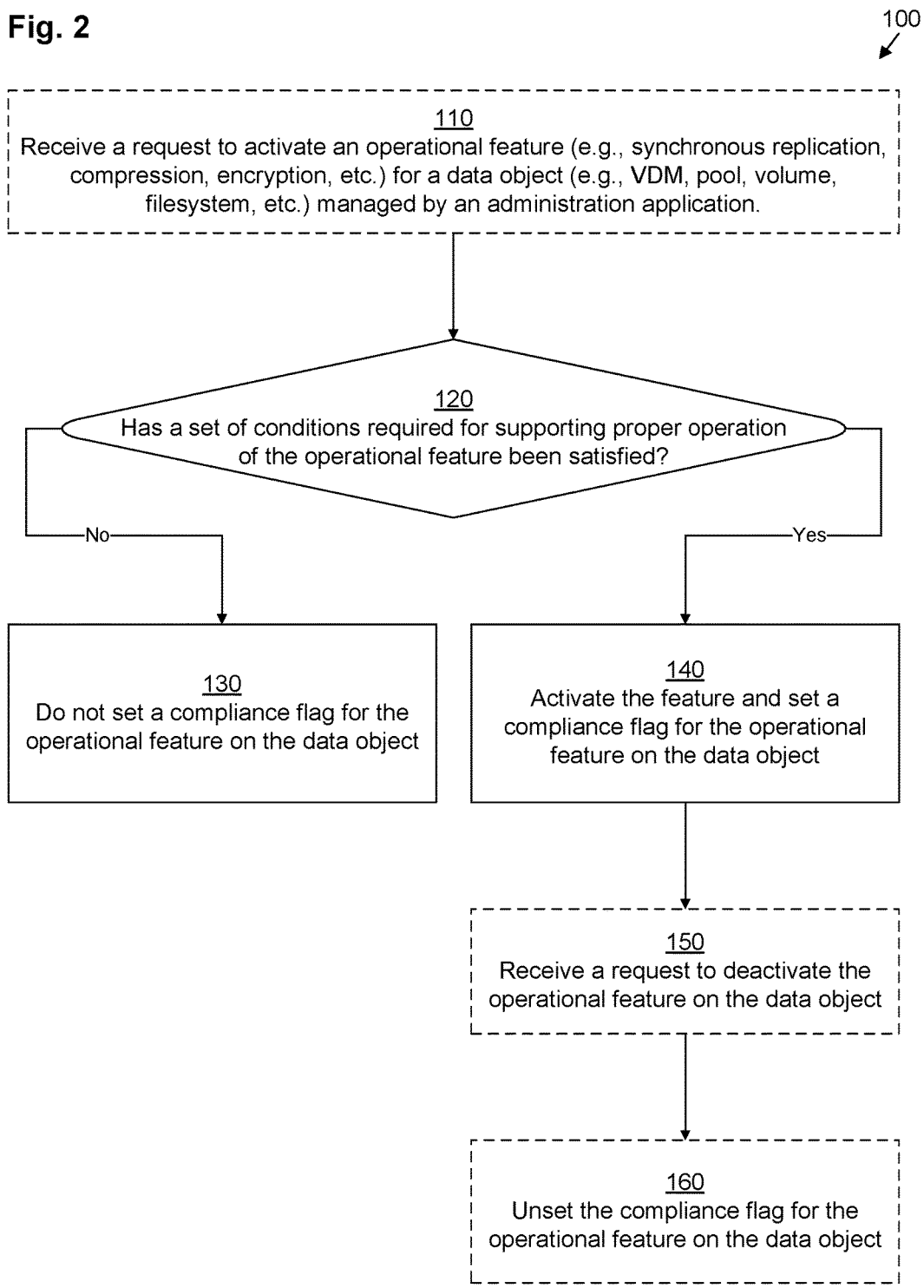

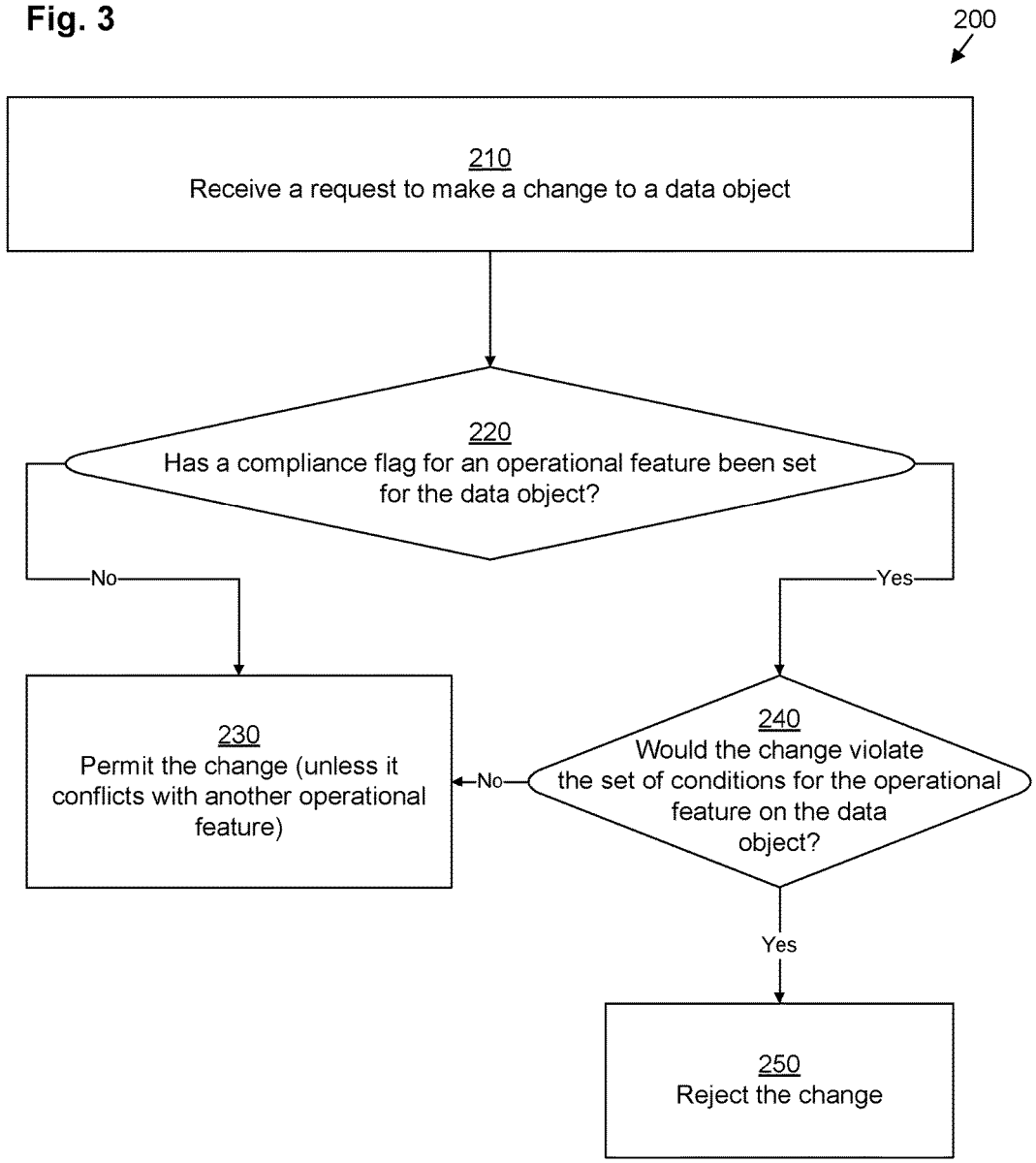

USING A FLAG TO SELECTIVELY PERMIT CONFIGURATION CHANGES TO A DATA STORAGE OBJECT HAVING AN ACTIVATED FEATURE

RELATED APPLICATION

This Application is related to and claims the benefit of priority from Chinese Patent Application No. 201510623730.1, filed on Sep. 25, 2015.

BACKGROUND

Data storage systems are arrangements of hardware and software that include one or more storage processors coupled to arrays of non-volatile storage devices. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Users of data storage systems can often establish settings on data objects that affect their configuration. For example, a user might change where snapshots are stored or how logging is performed.

SUMMARY

Unfortunately, some configuration changes that users can perform on data objects can be disruptive to ongoing features or activities. For example, some systems utilize techniques for managing replication of data objects in a data storage system. Some replication solutions require administrators or other users to configure replication settings and to establish individual replication sessions on each filesystem of a virtual data mover (VDM) one at a time. As each user may operate tens or even hundreds of filesystems on a data storage system, configuring and establishing replication sessions on such large numbers of filesystems can present a significant administrative burden. Some systems utilize techniques for managing replication of data objects in a data storage system on a per-VDM basis. However, in order to activate synchronous replication on a per-VDM basis, certain prerequisite conditions must be met for the particular VDM and a storage pool that it is associated with. If these conditions are not maintained as long as the replication session continues, inconsistent operation may ensue.

Thus, it would be desirable to implement techniques for enforcing the prerequisite conditions both upon initiation of a feature or activity and while that feature or activity is maintained. Accordingly, improved techniques enforce conditions by setting a flag associated with a data object upon confirming that the conditions have been met and checking the flag anytime a configuration change to the data object is requested that would cause the conditions to be violated. If the flag is set, any configuration change that would cause the conditions to be violated is rejected.

One embodiment of the improved techniques is directed to a method of managing an operational feature of a data object managed by an administration application running on a data storage system, the data object backed by persistent storage of the data storage system. The method includes (1) checking, by the administration application, characteristics of the data object to confirm whether the data object satisfies a set of conditions required for supporting performance of the operational feature, (2) upon confirming that the data object satisfies the set of conditions, setting, by the administration application, a compliance flag for the data object, (3) receiving, by the administration application, a request to make a configuration change to the data object, (4) performing, by the administration application, a validation operation configured to (I) produce a first result when both (a) the compliance flag is set and (b) the configuration change would violate the set of conditions and (II) otherwise produce a second result, and (5) selectively rejecting, by the administration application, the request to make the configuration change to the data object in response to the validation operation yielding the first result. In some embodiments, the data object may be a VDM having an associated storage pool and the operational feature may be synchronous remote replication onto a remote system. In other embodiments, the method may be applied to other data objects and other operational features (e.g., a storage volume with compression). Embodiments are also directed to a corresponding apparatus, computer program product, and system for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 2 is a flowchart depicting an example method according to various embodiments.

FIG. 3 is a flowchart depicting an example method according to various embodiments.

DETAILED DESCRIPTION

Figure 1:
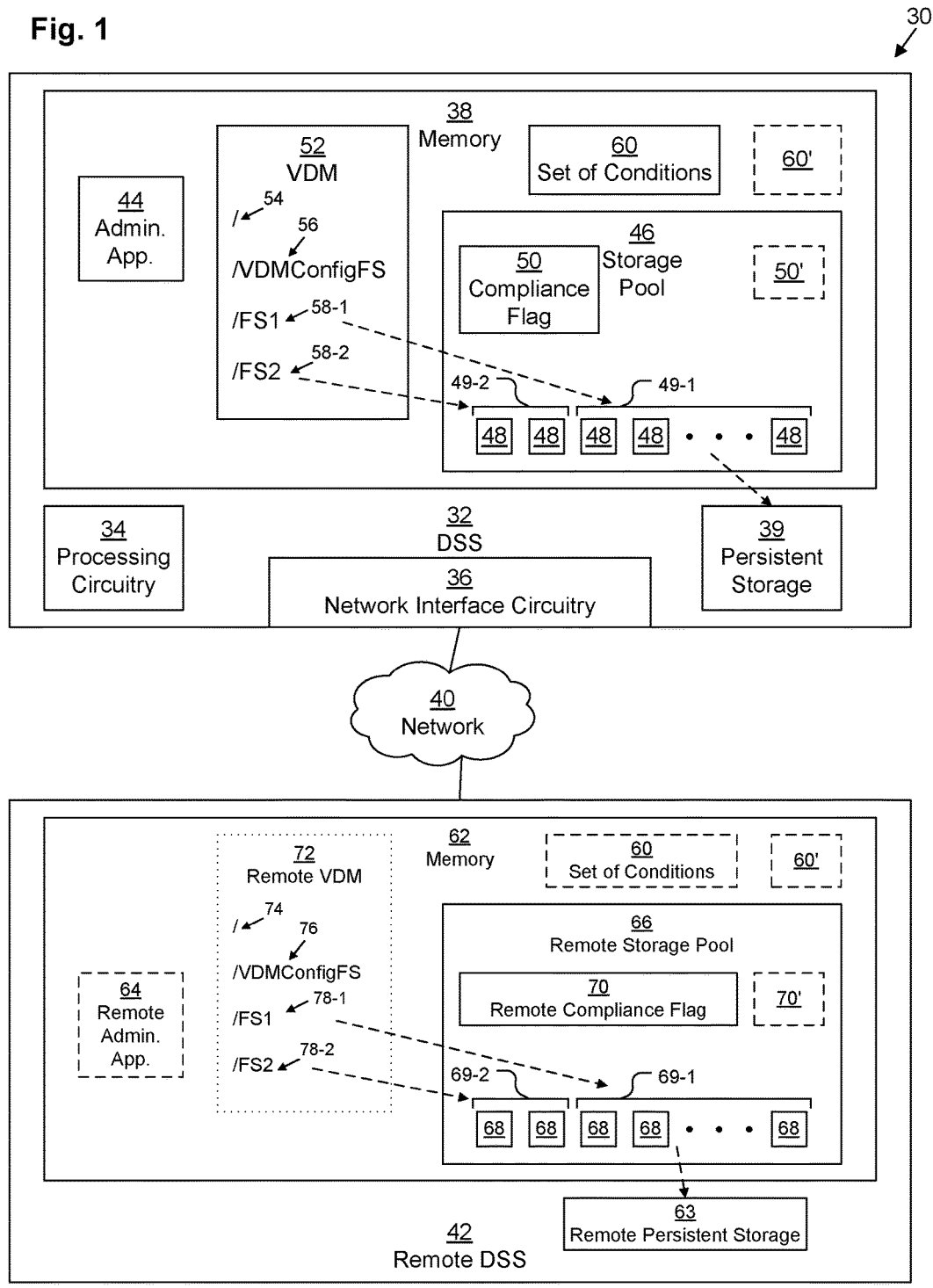
FIG. 1 is a block diagram depicting a logical view of an example system according to various embodiments.

Embodiments are directed to techniques for enforcing prerequisite conditions on a data object for an operational feature both upon initiation of that operational feature and while that operational feature is maintained. Accordingly, improved techniques enforce conditions by setting a flag associated with a data object upon confirming that the conditions have been met and checking the flag anytime a configuration change to the data object is requested that would cause the conditions to be violated. If the flag is set, any configuration change that would cause the conditions to be violated is rejected.

In some data storage systems, a storage processor may operate one or more virtual data movers (VDMs). A VDM is a logical grouping of filesystems, servers, and settings that is managed by a storage processor and provides a separate context for managing host data stored on an array. A single storage processor may provide multiple VDMs for different users or groups. For example, a first VDM may organize data for users in a first department of a company, whereas a second VDM may organize data for users in a second department of the company. Each VDM may include any number of host filesystems for storing user data. More information regarding VDMs can be found in U.S. patent application Ser. No. 13/828,294 entitled "UNIFIED DATAPATH PROCESSING WITH VIRTUALIZED STORAGE PROCESSORS," filed on Mar. 14, 2013, which is hereby incorporated by reference in its entirety.

Some systems utilize techniques for managing replication of VDMs in a data storage system on a per-VDM basis by (i) identifying the data objects (e.g., filesystems, LUNs, block-based vVOLs, file-based vVOLs, etc.) associated with a particular VDM, (ii) establishing a common set of replication settings across all of the data objects associated with that VDM, and (iii) replicating the VDM by replicating each of the identified data objects associated with the VDM in accordance with the common set of replication settings established across all of the data objects associated with the VDM. Techniques for replicating VDMs using synchronous replication are described in U.S. patent application Ser. No. 14/041,191 entitled "SYNCHRONOUS REPLICATION OF VIRTUALIZED STORAGE PROCESSORS," filed on Sep. 30, 2013, which is hereby incorporated by reference in its entirety.

FIG. 1 depicts a data storage environment 30. Data storage environment 30 includes a data storage system (DSS) 32 connected to a network 40. Data storage environment 30 may also include one or more remote DSSes 42 remote from the DSS 32 as well as one or more host devices (not depicted).

DSS 32 may be, an enterprise data storage system such as, for example, a VNX® series data storage system provided by the EMC Corporation of Hopkinton, Mass., although any computing device configured to provide data storage services may be used. DSS 32 is typically housed in one or more storage cabinets (not depicted). DSS 32 includes processing circuitry 34 interconnected with network interface circuitry 36, memory 38, and persistent storage 39. Processing circuitry 34 may be arranged in various configurations, including one or more processors on one or more storage processor boards (not depicted) or processing nodes (not depicted), which may also contain the network interface circuitry 36 and memory 38. Network interface circuitry 36 may include one or more Ethernet cards, cellular modems, Fibre Channel adapters, Wireless Fidelity (WiFi) wireless networking adapters, any other devices for connecting to network 40 (e.g., a storage area network, a local area network, a wide area network, etc.), or some combination thereof. The processing circuitry 34 of each storage processor or processing node may be made up of any kind of processor or set of processors configured to perform operations, such as, for example, a microprocessor, a multi-core microprocessor, a digital signal processor, a system on a chip, a collection of electronic circuits, a similar kind of controller, or any combination of the above. Processing circuitry 34 may also include circuitry configured to control disks of the persistent storage 39.

Memory 38 may be any kind of digital system memory, such as, for example, random access memory (RAM). Memory 38 stores an operating system in operation (not depicted, e.g., Linux, UNIX, Windows, or a similar operating system), various storage system management programs in operation (e.g., administration application 44), and one or more applications executing on processing circuitry 34 as well as data used by those applications. Memory 38 also stores an I/O stack (not depicted), which is configured to process data storage operations directed at the persistent storage 39 of the DSS 32.

Network 40 may be any kind of interconnect used to communicatively connect computing devices to each other, such as, for example, a storage area network, a local area network, a wide area network, a point-to-point connection, a fabric of interconnects and switches, etc. Remote DSS 42 has a structure similar to DSS 32

Memory 38 of DSS 32 stores at least one VDM 52 for managing a collection of one or more filesystems 58 (depicted as FS1 58-1, FS2 58-2). Each filesystem 58 is backed by a respective logical volume 49 (depicted as logical volumes 49-1, 49-2). Each logical volume 49 is backed by one or more slices 48. A slice 48 is a subset of persistent storage 39 of a fixed size, such as 256 megabytes or 1 gigabyte. Memory 38 also includes one or more storage pools 46, each of which is assigned a collection of slices 48 carved from persistent storage 39. In practice, each storage pool 46 is assigned a set of logical disks (not depicted) from which the slices 48 may be drawn. A storage pool 46 typically has one or more storage tiers, each tier drawing slices 48 of respective performance characteristics from the set of logical disks. Thus, for example, storage pool 46 may have two tiers: Gold and Silver. The Gold tier may, for example, draw slices 48 from logical disks each made up of a RAID 6 array spread across ten high-performance solid-state disk drives, while the Silver tier may, for example, draw slices 48 from logical disks each made up of a RAID 5 array spread across five magnetic disk drives.

VDM 52 includes a root filesystem 54, on which the other filesystems (e.g., FS1 58-1, FS2 58-2) may be mounted. Also mounted within root filesystem 54 is a configuration filesystem (depicted as VDMConfigFS 56), which stores configuration information about the VDM 52.

Storage pool 46 also includes a compliance flag 50 for an operational feature managed by administration application 44. An example of such an operational feature is synchronous remote replication whereby data objects of the DSS 32 are synchronously replicated on a remote DSS 42 for failover and/or load-balancing purposes. Thus, for example, a logical volume 49, a filesystem 58, an entire storage pool 46, or a VDM 52 may be synchronously replicated on a remote DSS 42. In this example, if the compliance flag 50 is set for the storage pool 46, then the entire storage pool 46 may be synchronously replicated on a remote DSS 42, which means that all slices 48 making up all logical volumes 49 are synchronously replicated on the remote DSS 42 and the VDM 52 and its filesystems 56, 58 may also all be synchronously replicated on the remote DSS 42 as destination VDM 72, which is dotted because it may be inactive until the source VDM 52 fails over to it. In other embodiments, even an inactive VDM 72 is not stored on the remote DSS 42 until the source VDM 52 fails over to it, and only configuration information for the destination VDM 72 is stored prior to failing over.

In order to enable synchronous remote replication for all of these data objects together, certain conditions must be met to ensure proper and consistent operation. Thus, for example, there must be exactly one VDM 52 assigned to the storage pool 46 and any logical volume 49 within the storage pool 46 that has a mounted filesystem must have that filesystem be mounted on that VDM 52 rather than any other location. In addition, there must be a destination VDM 72 and a destination storage pool 66 available on the remote DSS 42. The destination storage pool 66 must also have certain equivalent storage characteristics as the source storage pool 46. Thus, the destination storage pool 66 must have the same number of logical disks, each logical disk having a same size and number of slices as on the source storage pool 46. Thus, the destination storage pool 66 (stored within memory 62 of remote DSS 42) must have a same number of destination slices 68 as there are slices 48 on the source storage pool 46. In some embodiments, the destination storage pool 66 must also have the same or similar performance characteristics as the source storage pool 46. In such embodiments, each destination slice 68 (backed by persistent storage 63 of remote DSS 42) must be part of an equivalent storage tier having the same or similar speed characteristics of a respective slice 48 of the source storage pool 46.

There may also be additional conditions. For example, in some embodiments, all filesystems 58 on the respective VDM 52 must be split-log filesystems, in which journaling of changes is done to a log within the filesystem itself (rather than a common-log filesystem, in which several filesystems share a common log), while in some embodiments, filesystems 58 that do not do any journaling are also acceptable. In addition, in some embodiments, no filesystems 58 on the respective VDM 52 may have checkpoints or snapshots outside of the storage pool 46. In addition, in some embodiments there may be a general condition that no filesystem 58 on the VDM 52 may use any space outside of the storage pool 46. There may also be yet other conditions. Once synchronous remote replication has been enabled for the VDM 52, the destination VDM 72 will have a matching structure, including its own root filesystem 74, a matching configuration filesystem 76, and mounted filesystems 78 (depicted as FS1 78-1, FS2 78-2).

It should be understood that, although the operational feature has been mainly described as being synchronous remote replication for a storage pool 46 on the DSS 32, other operational features may be used in addition to or instead of that operational feature. Thus, the operational feature may be file compression or encryption for the storage pool 46 or for a particular volume 49 or filesystem 58.

The conditions for the particular operational feature may be stored as a set of conditions 60 within memory 38. If there are multiple operational features, each having different conditions, there may be a set of conditions 60' for each respective additional operational feature. In some embodiments, one or more of the sets of conditions 60, 60' may be replicated on the remote DSS 42. There may also be an additional compliance flag 50' for each respective additional operational feature. The compliance flags 50, 50' each indicate whether its respective data object (e.g., the storage pool 46) has satisfied the respective set of conditions 60, 60' for its respective operational feature and whether that operational feature has been enabled. Once a compliance flag 50, 50' has been set (e.g., having a value of TRUE), the administration application 44 will enforce the set of conditions 60, 60' for the respective operational feature (e.g., forbidding any configuration changes that would violate the respective set of conditions 60, 60') until the compliance flag 50, 50' has been unset (e.g., having a value of FALSE). Because the set of conditions 60, 60' may also include conditions that affect other data objects, such as the destination storage pool 66, there may be remote compliance flags 70, 70' on the destination storage pool 66. Thus, if a user attempts to make a configuration change to the destination storage pool 66 or the (inactive) destination VDM 72, the administration application 44 or a remote administration application 64 (running on the remote DSS) may enforce the respective set of conditions 60, 60' after confirming that the respective remote compliance flag 70, 70' is set.

In some embodiments, memory 38, 62 may also include a persistent storage portion (not depicted). Persistent storage may be made up of one or more persistent storage devices, such as, for example, hard disk drives, solid-state storage devices, flash drives, etc. Persistent storage is configured to store programs and data even while the data storage system 32, 42 (or a respective storage processor or processing node) is powered off. The OS (e.g., Linux, UNIX, Windows, or a similar operating system) and the applications (e.g., administration applications 44, 64) are typically stored in either the persistent storage of memory 38, 62 or in persistent storage 39, 63 so that they may be loaded into a volatile (system) memory portion of memory 38, 62 from persistent storage upon a system restart. These applications, when stored in non-transient form either in the volatile portion of memory 38, 62 or in persistent storage, form a computer program product. The processing circuitry 34 running one or more of these applications thus forms a specialized circuit constructed and arranged to carry out the various processes described herein.

FIG. 2 illustrates an example method 100 performed by administration application 44 for activating an operational feature having a set of conditions 60 for a data object (e.g., a storage pool 46, VDM 52, filesystem 58, logical volume 49, etc.). It should be understood that any time a piece of software (e.g., administration application 44) is described as performing a method, process, step, or function, in actuality what is meant is that a computing device (e.g., DSS 32) on which that piece of software is running performs the method, process, step, or function when executing that piece of software on its processing circuitry 34. It should be understood that, within FIG. 2, steps 110, 150, and 160 are dashed because they may be optional and not fundamental to method 100. However, it should be understood that, in some embodiments, one or more of the other steps may also be omitted. Similarly, in some embodiments, one or more steps may be combined together or performed in a different order.

In step 110, administration application 44 receives a request to activate an operational feature (e.g., synchronous replication, compression, encryption, etc.) for a data object (e.g., VDM 52, storage pool 46, volume 49, filesystem 58, etc.) managed by administration application 44. The request may be received via network interface circuitry 36 from a host device across network 40, for example.

In step 120, in response, administration application 44 checks whether or not the set of conditions 60 for that operational feature has been satisfied for the data object. This may include also checking whether the set of conditions 60 has been satisfied with respect to ancillary data objects. For example, in the case of synchronous replication of a VDM 52, the administration application 44 checks not only the VDM 52 itself, but also its member filesystems 54, 56, 58, its associated storage pool 46 and its associated volumes 49, and standby associated destination VDM 72. If the set of conditions 60 has not been satisfied, then operation proceeds with step 130, in which the administration application 44 refrains from activating the operational feature and refrains from setting the compliance flag 60. Method 100 may then repeat. In some embodiments, if the set of conditions 60 has not been satisfied, the administration application 44 may first attempt to rectify the situation by modifying various configuration options, if possible, to cause the set of conditions 60 to be satisfied.

If the set of conditions 60 has been satisfied, then operation proceeds with step 140, in which the administration application 44 activates the operational feature and sets the compliance flag 60 to TRUE. The administration application 44 may also set the remote compliance flag 70 on the remote DSS 42 in the case of remote synchronous replication or any other operational feature that includes conditions on remote DSS 42. In some embodiments, the administration application 44 does this by directing the remote the administration application 64 to set the remote compliance flag 70.

Subsequent to setting the compliance flag 60, steps 150 and 160 may be performed. In step 150, administration application 44 receives a request to deactivate the operational feature for the data object. This request may be received via network interface circuitry 36 from a host device across network 40, for example. In response, in step 160, administration application 44 deactivates the operational feature and unsets the compliance flag 60 (to, e.g., a value of FALSE). In some embodiments, step 160 may also involve unsetting the remote compliance flag 70. Method 100 may then repeat.

It should be understood that method 100 may also be performed with respect to a second operational feature having another set of conditions 60' and another compliance flag 50' in an analogous manner.

FIG. 3 illustrates an example method 200 performed by administration application 44 or remote administration application 64 for enforcing a set of conditions 60, 60' based on whether or not a compliance flag 50, 50', 70, 70' has been set for the respective operational feature. It should be understood that any time a piece of software (e.g., administration application 44, remote administration application 64) is described as performing a method, process, step, or function, in actuality what is meant is that a computing device (e.g., DSS 32, remote DSS 42) on which that piece of software is running performs the method, process, step, or function when executing that piece of software on its processing circuitry 34. It should be understood that, in some embodiments, one or more of the steps may be omitted. Similarly, in some embodiments, one or more steps may be combined together or performed in a different order.

In step 210, administration application 44 (or remote administration application 64) receives a request to make a configuration change to a data object (e.g., VDM 52, storage pool 46, volume 49, filesystem 58, etc.; or remote VDM 72, remote storage pool 66, volume 69, filesystem 78, etc.) managed by administration application 44 (or remote administration application 64) for which a compliance flag 50, 50' (or 70, 70') exists (whether set or unset). In some embodiments, this may include receiving a request to make a configuration change to a data object ancillary to another data object that has a compliance flag 50, 50' (or 70, 70'). This request may be received via network interface circuitry 36 from a host device across network 40, for example.

In step 220, in response, administration application 44 (or remote administration application 64) checks whether or not a compliance flag 50, 50' (or 70, 70') for that respective operational feature has been satisfied for the data object or a data object to which that data object is ancillary. For example, in the case of synchronous replication of a VDM 52, upon receiving a request to modify configuration options of FS1 58-1, administration application checks whether the compliance flag 50 for storage pool 46 is set. If the compliance flag 50, 50' has not been set, then operation proceeds with step 230, in which the administration application 44 (or remote administration application 64) permits the requested configuration change to be made (unless the configuration change conflicts with another activated operational feature). Method 200 may then repeat.

If the compliance flag 50, 50' is set, then operation proceeds with step 240, in which the administration application 44 (or remote administration application 64) checks whether or not performing the requested configuration change would cause the set of conditions 60, 60' to be violated. If it would, then operation proceeds with step 250 in which the administration application 44 (or remote administration application 64) rejects the request to make the configuration change. Method 200 may then repeat. Otherwise, operation proceeds with step 230, in which the administration application 44 (or remote administration application 64) permits the requested configuration change to be made or performs the requested configuration change itself (unless the configuration change conflicts with another activated operational feature). Method 200 may then repeat. For example, if the requested configuration change was a request to change FS1 58-1 from a split-log filesystem to a non-split-log filesystem, then, since that would violate the set of conditions 60 for synchronous remote replication of the VDM 52, the administration application 44 would proceed with step 250 and refrain from making the requested configuration change.

It should be understood that, in embodiments in which multiple operational features are possible for a given data object, multiple compliance flags 50, 50' (or 70, 70') may be present for that data object (whether set or unset), and method 200 will involve performing steps 220-250 for BOTH operational features. Only if operation proceeds with step 230 for BOTH operational features will the requested configuration change be permitted.

Thus, techniques for enforcing conditions of a set of conditions 60 both upon activation of a synchronous replication session and while the synchronous replication is maintained have been presented. This result may be achieved by (method 100) setting a compliance flag 50 (and remote compliance flag 70) associated with a storage pool 46 (and remote storage pool 66) of a VDM 52 being synchronously replicated onto a destination VDM 72 upon confirming that the conditions have been met and (method 200) checking the compliance flag 50, 70 anytime a configuration change to the storage pool 46, 66 or VDM 52, 72 is requested that would cause the conditions to be violated. If the flag 50, 70 is set, any such configuration change that would cause the conditions to be violated will not be permitted. More generalized embodiments have also been presented involving other types of operational features and data objects as well embodiments involving multiple different operational features with their own respective sets of conditions 60, 60'.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method of managing an operational feature of a data object managed by an administration application running on a data storage system, the data object backed by persistent storage of the data storage system, the method comprising:

receiving, by the administration application, a request to activate the operational feature for the data object; and in response to receiving the request to activate the operational feature, checking, by the administration application, characteristics of the data object to confirm whether the data object satisfies a set of conditions required for supporting performance of the operational feature;

upon confirming that the data object satisfies the set of conditions, setting, by the administration application, a compliance flag for the data object;

receiving, by the administration application, a request to make a configuration change to the data object;

performing, by the administration application, a validation operation configured to:
produce a first result when both (a) the compliance flag is set and (b) the configuration change would violate the set of conditions; and
otherwise, produce a second result;

selectively rejecting, by the administration application, the request to make the configuration change to the data object in response to the validation operation yielding the first result;

receiving, by the administration application, another request to activate another operational feature of the data object;

checking, by the administration application, characteristics of the data object to confirm whether the data object satisfies another set of conditions required for supporting performance of the other operational feature;

upon confirming that the data object satisfies the other set of conditions, setting, by the administration application, another compliance flag for the data object;

performing, by the administration application, another validation operation configured to:
produce a third result when both (i) the other compliance flag is set and (ii) the configuration change would violate the other set of conditions; and
otherwise produce a fourth result; and selectively rejecting the request to make the configuration change to the data object in response to the other validation operation yielding the third result.

2. The method of claim 1 wherein the data object is a source virtual data mover (VDM) of the data storage system, the source VDM built upon an associated source storage pool of the data storage system, and the operational feature is synchronous replication of the source VDM onto a destination VDM of a remote data storage system including synchronous remote replication of the source storage pool onto a destination storage pool of the remote data storage system, the synchronous remote replication keeping data stored in the destination storage pool in a state consistent with data stored in the source storage pool.

3. The method of claim 2 wherein the set of conditions includes a condition requiring that the source VDM have exactly one root filesystem.

4. The method of claim 3 wherein the set of conditions further includes another condition requiring that all mounted filesystems within the storage pool are mounted to mountpoints within the one root filesystem of the source VDM.

5. The method of claim 2 wherein the set of conditions includes a condition requiring that all filesystems of the source VDM be split-log filesystems which journal changes to a local log within each respective filesystem.

6. The method of claim 2 wherein the set of conditions includes a condition requiring that no filesystems of the source VDM have checkpoints outside the source storage pool.

7. The method of claim 2 wherein the set of conditions includes a condition requiring that no filesystems of the source VDM use any space outside the source storage pool.

8. The method of claim 2 wherein the set of conditions includes a condition requiring that the destination storage pool be available on the remote data storage system, the destination storage pool having a same number of storage slices having a same respective set of performance characteristics as the source storage pool.

9. The method of claim 1 wherein the data object is a data storage volume and the operational feature is a data compression feature enabled for the data storage volume.

10. The method of claim 1 wherein the method further comprises:
receiving, by the administration application, a request to deactivate the operational feature; and
in response to receiving the request to deactivate the operational feature, unsetting, by the administration application, the compliance flag for the data object.

11. The method of claim 1 wherein:
the method further comprises:
activating the operational feature for the data object upon confirming that the data object satisfies the set of conditions; and
activating the other operational feature for the data object upon confirming that the data object satisfies the other set of conditions;
receiving the request to make the configuration change to the data object is performed subsequent to setting the compliance flag and the other compliance flag for the data object and subsequent to activating the operational feature and the other operational feature for the data object; and
selectively rejecting the request to make the configuration change to the data object in response to the validation operation yielding the first result and selectively rejecting the request to make the configuration change to the data object in response to the other validation operation yielding the third result include performing a selective configuration change operation configured to:
implement the configuration change to the data object in response to both the validation operation yielding the second result and the other validation operation yielding the fourth result; and
reject the request to make the configuration change to the data object in response to at least one of the validation operation yielding the first result and the other validation operation yielding the third result.

12. An apparatus comprising:
persistent data storage; and
processing circuitry coupled to memory, the processing circuitry configured to execute an administration application that manages a data object backed by the persistent data storage, the administration application being configured to manage an operational feature of the data object by:
receiving a request to activate the operational feature for the data object, wherein:
the data object is a source virtual data mover (VDM) hosted by the apparatus, the source VDM built upon an associated source storage pool of the persistent data storage of the apparatus; and
the operational feature is synchronous replication of the source VDM onto a destination VDM hosted by a remote data storage system including synchronous remote replication of the source storage pool onto a destination storage pool of the remote data storage system, the synchronous remote replication keeping data stored in the destination storage pool in a state consistent with data stored in the source storage pool;

in response to receiving the request to activate the operational feature, checking characteristics of the data object to confirm whether the data object satisfies a set of conditions required for supporting performance of the operational feature;

upon confirming that the data object satisfies the set of conditions, setting a compliance flag for the data object and activating the operational feature for the data object, wherein the set of conditions includes at least one condition from the following set of conditions:

a condition requiring that the source VDM have exactly one root filesystem;

a condition requiring that all filesystems of the source VDM be split-log filesystems which journal changes to a local log within each respective filesystem;

a condition requiring that no filesystems of the source VDM have checkpoints outside the source storage pool;

a condition requiring that no filesystems of the source VDM use any space outside the source storage pool; and a condition requiring that the destination storage pool be available on the remote data storage system, the destination storage pool having a same number of storage slices having a same respective set of performance characteristics as the source storage pool;

subsequently, receiving a request to make a configuration change to the data object;

performing a validation operation configured to:
produce a first result when both (a) the compliance flag is set and (b) the configuration change would violate the set of conditions; and
otherwise produce a second result; and performing a selective configuration change operation configured to:
implement the configuration change to the data object in response to the validation operation yielding the second result; and
reject the request to make the configuration change to the data object in response to the validation operation yielding the first result.

13. A computer program product comprising a non-transitory computer-readable storage medium storing a set of instructions, which, when executed by a storage processor of a data storage system, cause the data storage system to manage an operational feature of a data object managed by an administration application running on the storage processor by:

receiving a request to activate the operational feature for the data object, wherein:
the data object is a source virtual data mover (VDM) of the data storage system, the source VDM built upon an associated source storage pool of the data storage system; and the operational feature is synchronous replication of the source VDM onto a destination VDM of a remote data storage system including synchronous remote replication of the source storage pool onto a destination storage pool of the remote data storage system, the synchronous remote replication keeping data stored in the destination storage pool in a state consistent with data stored in the source storage pool;

in response to receiving the request to activate the operational feature, checking characteristics of the data object to confirm whether the data object satisfies a set of conditions required for supporting performance of the operational feature;

upon confirming that the data object satisfies the set of conditions, setting a compliance flag for the data object and activating the operational feature for the data object, wherein the set of conditions includes a condition requiring that the destination storage pool be available on the remote data storage system, the destination storage pool having a same number of storage slices having a same respective set of performance characteristics as the source storage pool;

subsequently, receiving a request to make a configuration change to the data object;

performing a validation operation configured to:
produce a first result when both (a) the compliance flag is set and (b) the configuration change would violate the set of conditions; and
otherwise produce a second result; and performing a selective configuration change operation configured to:
implement the configuration change to the data object in response to the validation operation yielding the second result; and
reject the request to make the configuration change to the data object in response to the validation operation yielding the first result.

14. The computer program product of claim 13 wherein the set of instructions, when executed by the storage processor of the data storage system, further cause the data storage system to manage the operational feature of the data object managed by the administration application by, upon confirming that the data object satisfies the set of conditions:

setting a remote compliance flag for the destination storage pool;

receiving another request to make another configuration change to the destination VDM;

performing another validation operation configured to:
produce a third result when both (i) the remote compliance flag is set and (ii) the other configuration change would violate the set of conditions; and
otherwise produce a fourth result; and selectively rejecting the other request to make the other configuration change to the destination VDM in response to the other validation operation yielding the third result rather than the fourth result.

\* \* \* \* \*